(12) United States Patent
Schuld et al.

(10) Patent No.: US 7,537,630 B2
(45) Date of Patent: May 26, 2009

(54) FOLDING FILTER FRAME AND FILTER

(75) Inventors: Daniel E. Schuld, Inverness, IL (US); Donald N. Jursich, Crystal Lake, IL (US); Edward M. Hopman, Streamwood, IL (US); Robert C. Squier, Hampshire, IL (US)

(73) Assignee: RPS Products, Inc., Hampshire, IL (US)

( * ) Notice: Subject to any disclaimer, the term of this patent is extended or adjusted under 35 U.S.C. 154(b) by 525 days.

(21) Appl. No.: 11/501,323

(22) Filed: Aug. 9, 2006

(65) Prior Publication Data

US 2008/0034718 A1 Feb. 14, 2008

(51) Int. Cl.
*B01D 46/00* (2006.01)

(52) U.S. Cl. .................. 55/496; 55/DIG. 31; 55/495

(58) Field of Classification Search ............. 55/496, 55/490, 500, 501, 495, DIG. 31
See application file for complete search history.

(56) References Cited

U.S. PATENT DOCUMENTS

| | | | |
|---|---|---|---|
| 4,684,034 A | | 8/1987 | Ono et al. |
| 5,188,646 A | | 2/1993 | Nolen, Jr. |
| 5,252,111 A | * | 10/1993 | Spencer et al. ............ 55/489 |
| 5,364,458 A | | 11/1994 | Burnett et al. |
| 5,743,927 A | * | 4/1998 | Osendorf .................. 55/497 |
| 5,968,217 A | | 10/1999 | Stein et al. |
| 6,053,346 A | | 4/2000 | Niles et al. |
| 6,059,966 A | * | 5/2000 | Brandhofer et al. ........ 210/232 |
| 6,406,509 B1 | * | 6/2002 | Duffy ...................... 55/492 |
| 6,502,909 B1 | | 1/2003 | Swilik, Jr. et al. |
| 6,599,343 B2 | | 7/2003 | Fredrick et al. |
| 6,638,333 B2 | | 10/2003 | Schuld et al. |
| 6,652,613 B2 | | 11/2003 | Shah et al. |
| 6,814,773 B2 | | 11/2004 | Shah et al. |
| 2003/0066424 A1 | | 4/2003 | Shah et al. |
| 2004/0182055 A1 | | 9/2004 | Wynn |
| 2005/0204713 A1 | | 9/2005 | Wu et al. |
| 2005/0204922 A1 | | 9/2005 | Wu et al. |
| 2007/0204576 A1 | * | 9/2007 | Terlson et al. ............. 55/496 |

* cited by examiner

*Primary Examiner*—Duane Smith
*Assistant Examiner*—Christopher P Jones
(74) *Attorney, Agent, or Firm*—Greer, Burns & Crain, Ltd.

(57) ABSTRACT

A folding filter frame includes two end assemblies, each having a stationary panel having two ends, two folding panels, each having a folding end and a free end, and at least one track. The folding end of each folding panels is foldably secured to one of the ends of the stationary panel and the track runs perpendicular to a length of the end assembly. There is a stationary support extending from one end assembly to the other end assembly. Two side assemblies are present, each including a side panel with two ends and a engagement device secured to each end. The engagement device follows one the tracks of the end panels. The filter frame converts from a folded configuration to a deployed configuration by unfolding the folding panels and sliding the engagement devices in the tracks. A filter is made by positioning a filter media inside the folding frame.

20 Claims, 3 Drawing Sheets

FOLDING FILTER FRAME AND FILTER

FIELD OF THE INVENTION

This invention relates to a filter and filter frame. More specifically, it relates to a filter frame that has a folded configuration for storage and shipping, and a deployed configuration for use in a furnace or air purifier.

BACKGROUND

To perform satisfactorily, an air filter spreads a filter media over a surface area through which air passes. As the surface area increases, it becomes easier for the air to pass through the filter without requiring a high-powered fan to promote air circulation. However, as the surface area of the filter media increases, the frame usually increases in size to support the filter media over the larger surface area.

A typical disposable furnace filter can run as large as twenty inches square, twenty by twenty-five inches or even larger. Even though they are only a few inches thick, a large amount of space is needed to package, ship, warehouse, store and display the filters as they move from the manufacturing facility to the consumers' hands. If the volume of this product could be reduced, the cost of packaging, storage, shipping the filters could be reduced since these steps are priced primarily by volume.

Other attempts have been made to reduce the size of furnace filters prior to use in a furnace. A media filter cabinet is described in U.S. Pat. No. 6,502,909. It is shipped in a collapsed form and assembled prior to use. Top, front, back and bottom pieces each have a plurality of slots and tabs that interfit, forming the cabinet. It is secured with a single screw following assembly. A retaining bracket and wire, which must be sized to fit a particular filter, form a smaller compartment for a smaller filter. The retaining bracket has a flange that attaches to a receptacle in the front piece, locking with a quarter turn. The cabinet is collapsible diagonally upon removal of the retaining bracket, back panel and the door that attaches to the front piece. Although the filter cabinet does collapse, the manner in which it does so makes it inconvenient to reassemble prior to use.

A collapsible shipping container is discussed in U.S. Pat. No. 5,190,179. This container has an open construction with no panels covering the frame top and bottom. The end walls pivot inwardly of the container on hinges, allowing the top and end walls to lie on the bottom wall when collapsed.

Although collapsible filter frames and filters are known, they can be inconvenient or difficult to use. A consumer purchasing a furnace filter is unlikely to spend time reassembling a filter or getting out tools needed to put it together. Further, to justify the time spent deploying the filter, it should cost less than a conventional furnace filter.

SUMMARY OF THE INVENTION

The above-listed needs are met or exceeded by the present system for a folding filter frame and filter. The frame includes at least two end assemblies, each end assembly has a center stationary panel having two ends, at least two folding panels, each having a folding end and a free end and at least one track. The folding end of each of the folding panels is foldably secured to one of the ends of the stationary panel. There is at least one stationary support extending from one end assembly to the other end assembly. At least two side assemblies are present, each side assembly including a side panel having two ends and engagement device secured to each end. The engagement device is configured to engage with one of the end panels to guide movement of the side panel assembly from a folded configuration to a deployed configuration. The filter frame converts from a folded configuration to a deployed configuration by unfolding the folding panels and slidably moving each of the engagement devices in each of the tracks to open the frame. An improved filter is made by positioning a filter media inside the folding filter frame.

This filter frame is used in a filter that is economical, fast and easy to deploy. It reduces the shipping volume of the filter by more than half. No tools are needed for redeployment. The consumer need only unfold two panels on each side of the filter and slide the side panel outward along a track. An optional lock holds the filter in the deployed configuration during use.

DETAILED DESCRIPTION OF THE DRAWINGS

DETAILED DESCRIPTION OF THE INVENTION

Figure 1:
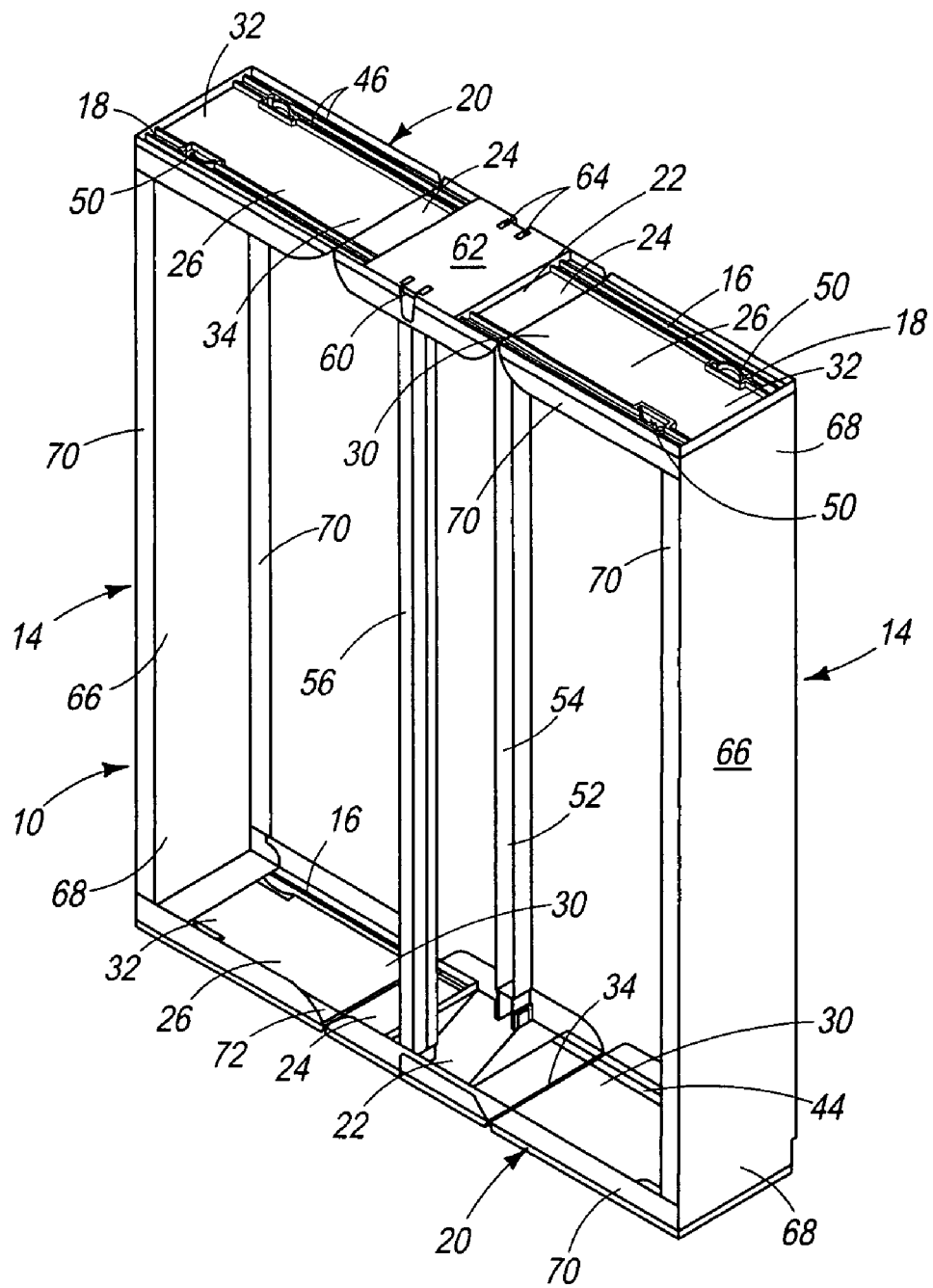
FIG. 1 is a perspective view of a folding filter frame of the present invention in the deployed configuration.

Referring to FIGS. 1-4, a folding filter frame, generally 10, is made to compactly house a filter media 12 during packaging, shipping and storage, but it opens to form a full-sized filter prior to use. For example, a 20 inch by 25 inch furnace opening may be only 6 inches by 20 inches when purchased because the filter media 12 frame is in a folded configuration. Prior to use, the filter media 12 is unfolded to the deployed configuration when it will attain the full 20 inch by 25 inch size. The frame 10 holds the filter media 12 in place to filter the furnace air.

Designations as to the top, bottom and sides of this filter frame 10 are completely arbitrary. For the purposes of making and using this filter frame 10, orientation of the frame makes no difference. For purposes of this discussion, any directional references refer to the filter frame 10 as it is oriented in FIG. 1, however, it is to be understood that these references are for ease of discussion only and are not intended to be limiting in any way.

The present filter frame 10 can be made of a variety of materials. Preferred materials include plastics, metal or metal foils and the like. Especially preferred materials are polypropylene and polystyrene. The suitable material is sufficiently rigid to support the filter media 12 and to hold the filter frame 10 shape in either the folded configuration or the deployed configuration. The material from which the frame parts are made must also allow a side panel, generally 14, to slidingly move with respect to an end panel assembly 20. A reusable frame 10 that is intended to accept a replacement filter media 12 is likely to be made of a more rigid material since it will be expected to hold its shape longer than a replacable filter. The various components of the filter frame 10 can be made from the same or different materials.

The filter frame 10 includes at least two end assemblies, generally 20, one forming the top and one forming the bottom of the filter frame 10. The top and bottom end assemblies 20 can differ as desired, but in a preferred configuration the end assemblies are substantially the same. At the center of each end assembly 20 is a center stationary panel 22 having two ends 24. This panel is stationary because it does not move when the filter frame 10 is converted from the folded configuration to the deployed configuration. The length of the stationary panel 22 is sufficiently long to hold the filter media 12 when it is folded to fit inside the filter frame 10 when the filter frame is in the folded configuration.

Each end assembly 20 also includes at least two folding panels 26. Each folding panel 26 has a folding end 30 and a free end 32. The folding end 30 of each of the folding panels 26 is foldably secured to one of the ends 24 of the stationary panel 22. Any method of securing the folding panel 26 to the stationary panel 22 is used that allows the folding panel 26 to move from a position substantially parallel to the stationary panel 22 to a position substantially perpendicular to the stationary panel 22. A hinge 34 may be used to foldably secure these two parts. In a preferred embodiment, the stationary panel 22 and the folding panel 26 secured using a living hinge 34. With a living hinge 34, the stationary panel 22 and the folding panels 26 are made of a single piece of material that flex to form the hinge 34. The end panel assembly 20 is grooved 34 or scored at the position where the flexing is to take place, so that the groove 34 serves as the end of the stationary panel 22 and also as the folding end 30 of the folding panel 26.

In some embodiments, there is at least one track 16 on each of the end assemblies 20 for use with an engagement device 18. It is also contemplated that there be more than one track 16 on each end assembly 20. Part of the at least one track 16 should run along each of the folding panels 26 in the direction of movement of the side assembly 14. The single track 16 is usable on the end assembly 20 when the track 16 moves from one folding panel 26 across the stationary panel 22 and onto a second folding panel 26. Preferably each folding panel 26 has a track 16 that runs from the free end 32, across the folding end 30 and onto the stationary panel 22. On the stationary panel 22, the track 16 extends far enough onto the stationary panel 22 to allow the side assembly 14 to fit inside the stationary panel 22 when the folding panel 26 is folded to the folded configuration.

Any type of track 16 can be used that guides the movement of the side panel assembly 14 to convert from a folded configuration to a deployed configuration. One type of track 16 is a slot 44 through which an engagement device 18 moves. Another preferred track 16 is a pair of parallel ridges 46 that limits movement of the engagement device 18. The track 16 runs substantially parallel to the length of the end assembly 20. Optionally there is a lock 50 on the track 16 that holds the filter frame 10 in the deployed configuration. The lock 50 is optionally a hook or cap that holds the engagement device 18 in position. It can also be a notch or bend in the track 16 that makes it difficult for the engagement device 18 to move back toward the folded configuration. Another suitable lock 50 is a mechanism that biases the engagement device 18 toward its position in the deployed configuration. A preferred track 16 includes both a pair of parallel ridges 46 and a slot 44 between the ridges. When used together, the ridges 46 act to protect the engagement device 18 and also prevent bypassing of air around the engagement device 18 as discussed below.

At least one stationary support 52 extends from one end assembly 20 to the other end assembly 20, separating them. The length of the stationary support 52 defines one of the finished dimensions of the deployed filter frame 10. With the stationary supports 52 in place, the folding frame 10 will finish in one dimension to be the total of the thickness of the stationary panels 22, the length of the stationary support 52 and any mounting hardware that is used to connect the stationary support 52 to the stationary panels 22. Typically, in a 20 inch by 25 inch finished filter, the length of the stationary support 52 is selected to hold the exterior of the stationary panels 22 about 25 inches apart. Preferably the stationary support 52 comprises "U" or "T" channel stock 54. A preferred method of mounting the stationary support 52 includes shaping each side 56 of the "U" channel into a tab 60. The three tabs 60 then fit into three slots 64 on the stationary panel 22 to hold it securely. This mounting technique is preferred since no additional mounting hardware is required. The tabs 60 are easily formed when the stationary support 52 is molded of plastic and the tabs 60 are shaped in the mold.

Preferably, the stationary panel 22 includes a support panel 62 that adds strength to the area of the end assembly 20 where the stationary support 62 attaches to the stationary panel 22. The support panel 62 is optionally an additional panel on the exterior surface of the stationary panel 22, or it may be as simple as a thickening of the stationary panel 22 for strength. When used, the support panel 62 covers the area where the stationary support 56 attaches to the stationary panel 62. In a preferred embodiment, the support panel 62 and the tops of the track ridges 46 lay in the same plane. This configuration allows the exterior of the filter frame 10 to form a good seal with the furnace opening so that a minimum amount of air bypasses the filter by going around the outside of the frame 10.

When in the deployed configuration, there are at least two side assemblies 14 that form the filter frame 10 into a rectangular shape with the end assemblies 20. Each of the side assemblies 14 includes one or more side panels 66. The side panel 66 has two ends 68 and the engagement device 18 is secured to each end 68. Preferably the side panels 66 are substantially flat panels that enclose the filter frame 10 between the end panel assemblies 20.

Figure 2:
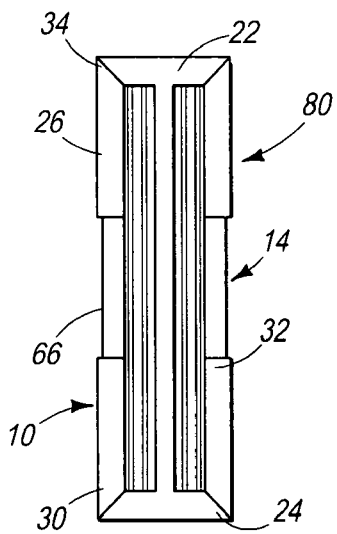
FIG. 2 is a front plan view of a folding filter of the present invention in the folded configuration.

In some preferred embodiments, the end panel assembly 20 and side panels 66 each have short frame walls 70 that extend from the edges of the stationary panel 22, folding panels 26 and side panels 66 toward the frame wall 70 opposed to it in the same plane. The frame walls 70 are short, about 1-2 inches, to allow a large amount of the filter media 12 to be exposed to the air passing through the filter, generally 80 (FIG. 2). Use of these walls 70 discourage air from flowing around the filter media 12 at the edges, thus bypassing the filtration step. Notches 72 are cut in the walls 70 in the vicinity of the hinge 34 to allow the hinge 34 to flex freely without being hindered by excess material at the frame wall 70.

The engagement device 18 is positioned at each end 68 of the side panels 66 and is configured to follow one of the tracks 16 of the end panel assembly 20. One or more engagement devices 18 are present, the exact number to be determined by the engagement device chosen. Preferably the engagement device 18 is a pin or other protrusion that rides in the track 16, limiting the movement of the side assembly 14. The shape of the protrusion 18 is not important as long as it rides within the track 16.

Figure 5:
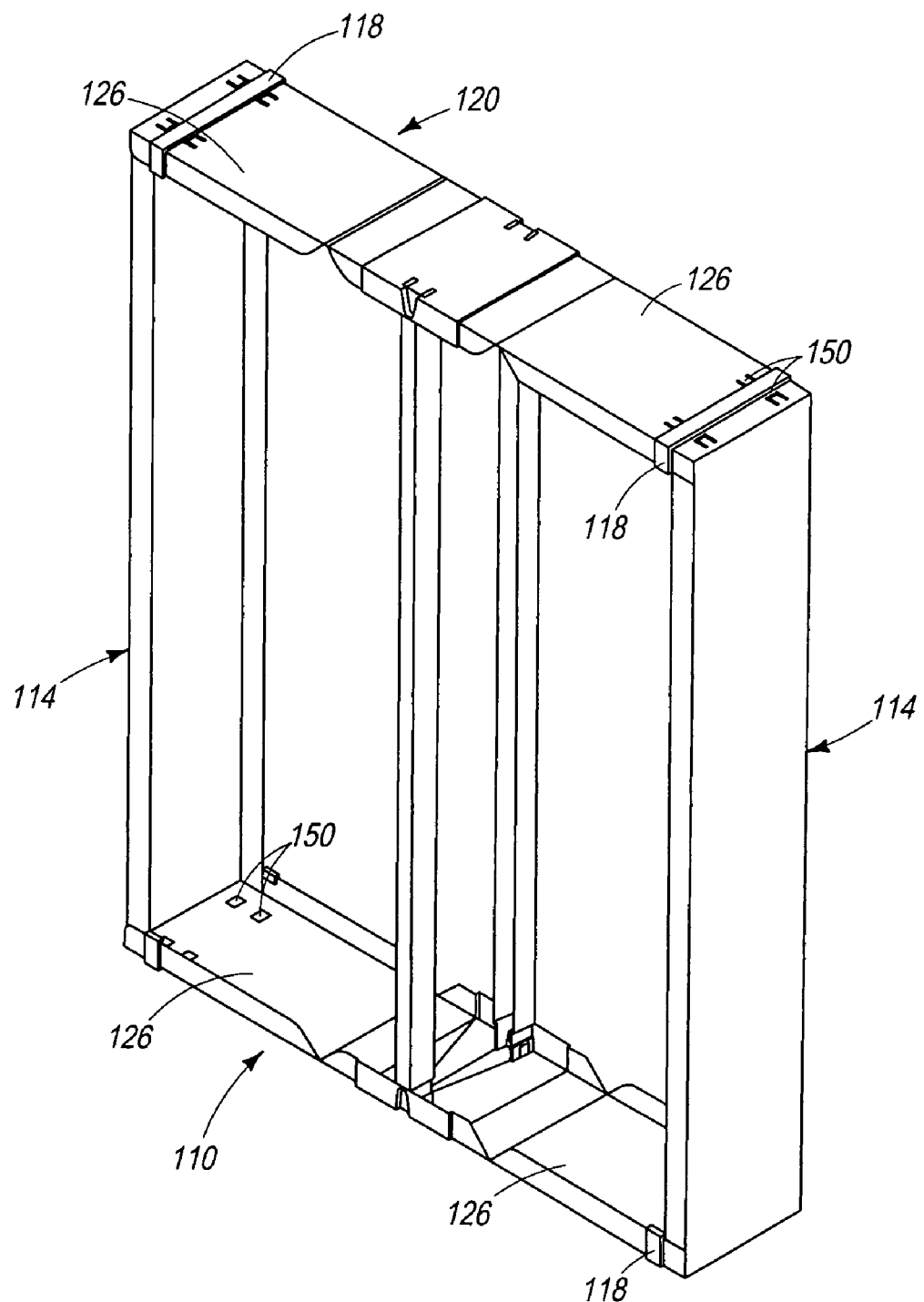
FIG. 5 is a second embodiment of the filter frame of the present invention.

An alternate embodiment of the folding filter frame 110 is shown in FIG. 5. Like numbers are used to show corresponding parts. In this embodiment, there is no track on the end assembly 120. The engagement device 118 is a band or C-clamp that is attached to the side panel assembly 114. In place of the track, the band 118 substantially wraps around the end assembly 120 to guide the movement of the side panel assembly 114 during deployment. Optionally, one or more stops on the folding panel 126 act as the lock 150, preventing the side panel assembly 114 from moving too far or becoming disengaged from the end panel assembly 120. This configuration is particularly suitable for use with narrow filter frames where removal of material to form the slot 50 would result in a weakening of the structure of the end panel assembly 20.

Figure 3:
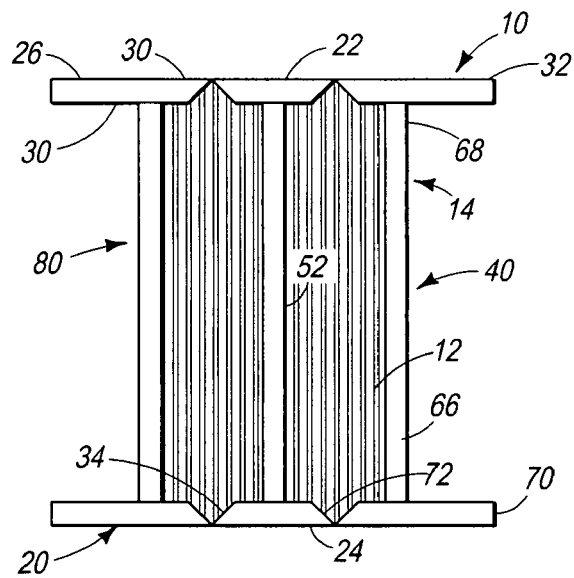
FIG. 3 is a front plan view of the folding filter of FIG. 2 in a position between the folded configuration and the deployed configuration.
Figure 4:
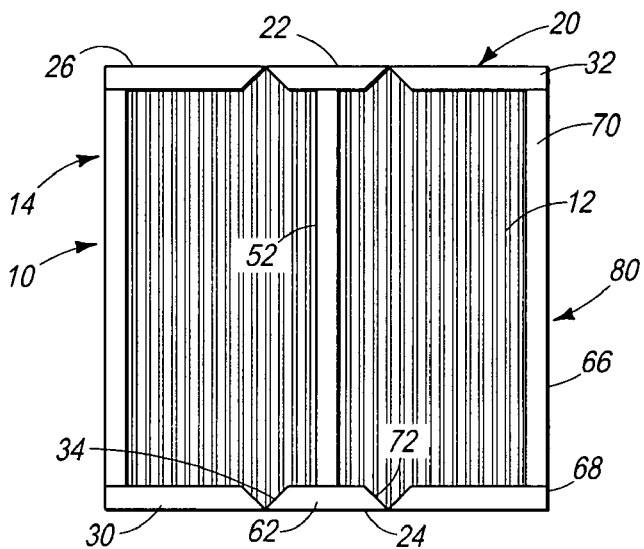
FIG. 4 is a front plan view of the folding filter of FIG. 2 in the deployed configuration.

Referring to FIGS. 2-4, in a deployed configuration, the filter frame 10 has each of the folding panels 26 unfolded so that they are substantially parallel to the stationary panel 22. In preferred embodiments, the folding panels 26 and the stationary panel 22 for one end assembly 20 all fall within the same plane. Each end 68 of each of the side panels 64 is near an end 32 of one of the folding panels 26 with the engagement device 18 engaged in the track 16. In this position, the side panels 66 form a corner with the folding panels 32 so that the filter frame 10 is generally rectangular.

The folded configuration is preferably used for packaging, shipping, warehousing, storing, displaying or any time when it is important for the filter frame 10 to occupy a minimum amount of space. In this configuration, an end 68 of each of the side panels 66 is near one of the ends 24 of the stationary panel 22 with each of the folding panels 26 folded to be substantially perpendicular with the stationary panel 22 and the engagement device 18 engaged in the track 16.

Conversion of the filter frame 10 from the folded configuration to the deployed configuration is accomplished by unfolding the folding panels 26 and slidably moving each of the engagement devices 18 in each of the tracks 16 on each of the end assemblies 20.

Referring to the addition of a filter media 12, the folding filter frame 10 becomes a folding filter, generally 80. The filter media 12 is preferably foldable with the filter frame 10 for convenience during use. Preferably, the fabric is a non-woven fabric. An accordion-pleated fabric is a good example of a suitable filter media 12. When this filter media 12 is installed with the pleats parallel to the stationary supports 56, the media 12 can be attached to the side assembly 14 so that the media 12 expands and contracts with the frame 10 as it moves between the folded and the deployed configurations.

While a particular embodiment of the folding filter and frame has been shown and described, it will be appreciated by those skilled in the art that changes and modifications may be made thereto without departing from the invention in its broader aspects and as set forth in the following claims.

What is claimed is:

1. A folding filter frame having a frame, comprising:
   at least two end assemblies, each said end assembly comprising:
      a center stationary panel having two ends; and
      at least two folding panels, each having a folding end and a free end;
   at least one stationary support extending from one of said end assemblies to the other of said end assemblies; and
   at least two side assemblies, each said side assembly comprising a side panel having two ends and an engagement device for slidably moving said side assembly along the end assembly during conversion of said filter frame from a folded configuration to a deployed configuration secured to each end.

2. The filter frame of claim 1 further comprising a lock.

3. The filter frame of claim 1 wherein at least some component of said filter frame is made from at least one of the materials consisting of plastic or metal.

4. The filter frame of claim 3 wherein said plastic is polypropylene or polystyrene.

5. The filter frame of claim 1 further comprising a track.

6. The filter frame of claim 5 wherein said track comprises a slot and a pair of parallel ridges.

7. The filter frame of claim 5 wherein said track comprises a slot.

8. The filter frame of claim 1 wherein said frame comprises at least two stationary supports, and wherein the support is made of "U"-channel stock.

9. The filter frame of claim 1 wherein said folding panel is foldably secured to said stationary panel with a hinge.

10. The filter frame of claim 9 wherein said hinge comprises a living hinge.

11. The filter frame of claim 9 wherein each of said end assemblies comprises a single flexible panel that comprises two living hinges.

12. A filter comprising the filter frame of claim 1 and a filter media installed within said filter frame.

13. The filter of claim 12 wherein said filter frame further comprises a lock to hold said frame in a deployed configuration.

14. The filter of claim 12 wherein said frame is made of polypropylene or polystyrene.

15. The filter of claim 12 wherein each of said end assemblies comprises a single sheet of polypropylene, wherein said stationary panel and each of said folded panels are secured by a living hinge.

16. The filter of claim 12 wherein each of said end panels further comprise a track.

17. The filter of claim 16 wherein said track comprises a pair of ridges with a slot therebetween.

18. The filter of claim 12 wherein said filter media is a pleated media.

19. The filter of claim 12 wherein said filter media is a non-woven fabric.

20. The filter of claim 18 wherein said filter media is positioned to have the pleats substantially parallel to the stationary support.

* * * * *